(12) United States Patent
Krichevsky et al.

(10) Patent No.: US 9,074,941 B1
(45) Date of Patent: Jul. 7, 2015

(54) SYSTEMS AND METHODS FOR MEASURING AMBIENT AND LASER TEMPERATURE IN HEAT ASSISTED MAGNETIC RECORDING

(71) Applicant: Western Digital Technologies, Inc., Irvine, CA (US)

(72) Inventors: Alexander Krichevsky, San Jose, CA (US); Robert J. Johnson, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 184 days.

(21) Appl. No.: 13/827,089

(22) Filed: Mar. 14, 2013

(51) Int. Cl.
G07D 5/00 (2006.01)
G01K 7/00 (2006.01)

(52) U.S. Cl.
CPC ..................................... *G01K 7/00* (2013.01)

(58) Field of Classification Search
USPC .......................................................... 73/163
See application file for complete search history.

(56) References Cited

U.S. PATENT DOCUMENTS

| | | | |
|---|---|---|---|
| 3,321,667 A * | 5/1967 | Hoyt, Jr. ........................ | 315/284 |
| 3,786,264 A * | 1/1974 | Ferro et al. ................ | 250/214 R |
| 5,392,273 A | 2/1995 | Masaki et al. | |
| 5,805,559 A | 9/1998 | Murakami et al. | |
| 6,018,789 A | 1/2000 | Sokolov et al. | |
| 6,046,970 A | 4/2000 | DeCusatis et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |

(Continued)

OTHER PUBLICATIONS

U.S. Appl. No. 13/787,760 to Champion et al., filed Mar. 6, 2013, 22 pages.

*Primary Examiner* — Lisa Caputo
*Assistant Examiner* — Jamel Williams

(57) ABSTRACT

Systems and methods for measuring ambient and laser temperature in heat assisted magnetic recording (HAMR) systems are provided. One such system includes a slider having a write head, a laser diode coupled to the slider and configured to direct energy to a magnetic medium, and a preamplifier circuit including a voltage measurement circuit configured to measure a voltage drop across the laser diode, and a current measurement circuit configured to measure a current through the laser diode, where the preamplifier circuit is configured to store calibration information including a plurality of temperatures corresponding with measurements of the voltage drop across the laser diode and measurements of the current through the laser diode, and calculate a temperature based on the measured voltage drop across the laser diode, the measured current through the laser diode, and the calibration information.

18 Claims, 7 Drawing Sheets

(56) References Cited

U.S. PATENT DOCUMENTS

| | | |
|---|---|---|
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,671,248 B2 | 12/2003 | Miyabata et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,822,985 B2 | 11/2004 | Tsunekane et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,357 B2 | 11/2005 | Sakamoto et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |

(56) References Cited

U.S. PATENT DOCUMENTS

| | | |
|---|---|---|
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,116,689 B2 | 10/2006 | Pitman |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,161,882 B2 | 1/2007 | Lehr et al. |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,478,007 B2 | 1/2009 | Farrell et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,724,470 B2 | 5/2010 | Poon et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,876,655 B2 | 1/2011 | Sasaki |
| 7,898,756 B1 | 3/2011 | Wang |
| 7,898,759 B2 | 3/2011 | Matsumoto et al. |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |

(56) References Cited

U.S. PATENT DOCUMENTS

| | | |
|---|---|---|
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,243,388 B2 * | 8/2012 | Shimazawa et al. ..... 360/125.74 |
| 8,271,692 B1 | 9/2012 | Dinh et al. |
| 8,279,550 B1 | 10/2012 | Hogg |
| 8,279,732 B2 * | 10/2012 | Watanabe et al. .......... 369/53.26 |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,667,248 B1 | 3/2014 | Yeo et al. |
| 8,670,205 B1 | 3/2014 | Neppalli |
| 8,671,250 B2 | 3/2014 | Malina et al. |
| 8,675,455 B1 * | 3/2014 | Lee |
| 8,681,442 B2 | 3/2014 | Krichevsky et al. ....... 369/13.24 |
| 8,681,445 B1 | 3/2014 | Hogg |
| 8,683,295 B1 | 3/2014 | Kermiche et al. |
| 8,687,306 B1 | 3/2014 | Syu et al. |
| 8,687,307 B1 | 4/2014 | Coker et al. |
| 8,687,313 B2 | 4/2014 | Patton, III |
| 8,693,133 B1 | 4/2014 | Selvaraj |
| 8,698,492 B1 | 4/2014 | Lee et al. |
| 8,699,171 B1 | 4/2014 | Mak et al. |
| 8,699,172 B1 | 4/2014 | Boyle |
| 8,711,500 B1 | 4/2014 | Gunderson et al. |
| 8,711,506 B1 | 4/2014 | Fong et al. |
| 8,711,665 B1 | 4/2014 | Giovenzana et al. |
| 8,717,694 B1 | 5/2014 | Hamid |
| 8,717,695 B1 | 5/2014 | Liew et al. |
| 8,730,612 B1 | 5/2014 | Lin et al. |
| 8,743,502 B1 | 6/2014 | Haralson |
| 8,749,911 B1 | 6/2014 | Bonke et al. |
| | | Sun et al. |
| 2004/0135595 A1 | 7/2004 | Chen et al. |
| 2006/0233061 A1 * | 10/2006 | Rausch et al. ............. 369/13.32 |
| 2008/0079438 A1 * | 4/2008 | Yamasaki et al. ............ 324/523 |
| 2008/0158730 A1 * | 7/2008 | Furukawa et al. ............ 360/110 |
| 2009/0113702 A1 | 5/2009 | Hogg |
| 2009/0225464 A1 | 9/2009 | Juang et al. |
| 2009/0296256 A1 * | 12/2009 | Tsuyama ........................ 360/59 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0294207 A1 * | 11/2013 | Erden et al. ................ 369/13.11 |
| 2013/0308431 A1 * | 11/2013 | Brenden ..................... 369/13.24 |
| 2014/0269819 A1 * | 9/2014 | Kiely et al. ..................... 374/45 |

* cited by examiner

SYSTEMS AND METHODS FOR MEASURING AMBIENT AND LASER TEMPERATURE IN HEAT ASSISTED MAGNETIC RECORDING

BACKGROUND

Energy/Heat Assisted Magnetic Recording (EAMR/HAMR) systems can potentially increase the areal density of information recorded magnetically several times, avoiding data erasure caused by thermal fluctuations, by using high-coercivity media materials. Many or all modern prototype HAMR recording head designs employ a laser diode for heating the media. As the media temperature approaches the Curie point, even small variations of laser power can have a major effect on the quality of data recording. In particular, as the laser diode temperature rises, either by laser self-heating or at higher ambient temperatures, the lasing threshold increases and the laser power (and hence the media temperature during recording) at any given current level decreases. On the other hand, the magnetic properties of the media near the Curie point are very sensitive to the temperature, thereby amplifying the effect of the laser power (and hence media temperature) variations on HAMR write performance. As such, some laser power variations, as small as 5% for example, may result in unacceptable fluctuations. Therefore, it would be beneficial if the laser temperature could be continuously monitored and the laser current adjusted accordingly in order to keep a HAMR head near the peak of its writing capability.

DETAILED DESCRIPTION

Figure 1:
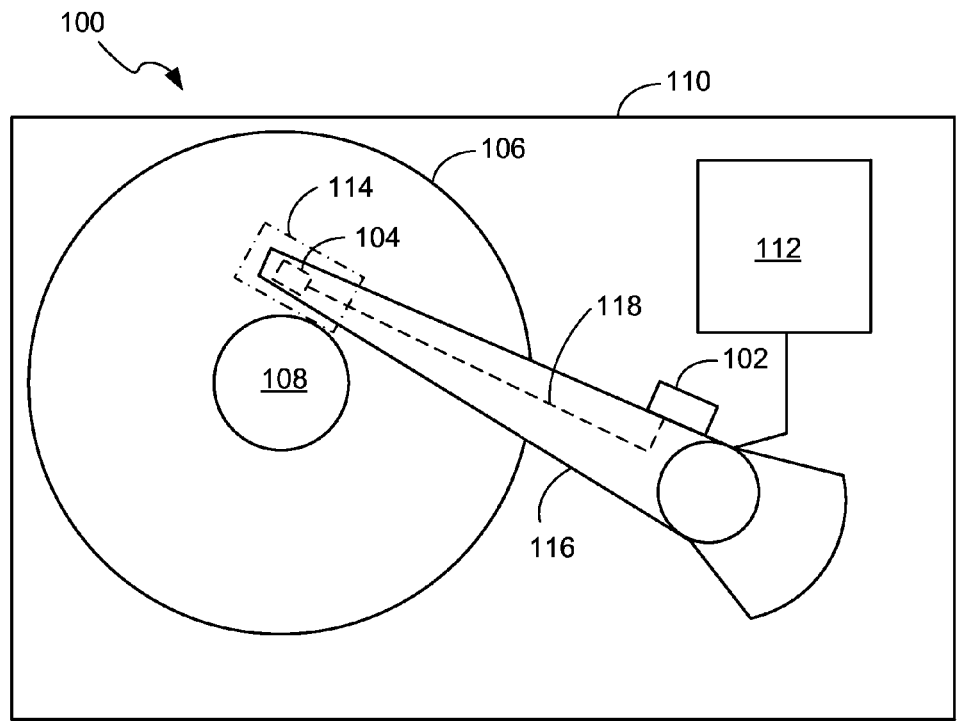
FIG. 1 is a top schematic view of a disk drive including a heat assisted magnetic recording (HAMR) system including a preamplifier circuit configured to measure temperature in a laser diode or ambient temperature in accordance with one embodiment of the invention.

Referring now to the drawings, embodiments of systems and methods for measuring ambient and laser temperature in heat assisted magnetic recording (HAMR) systems are illustrated. The systems include circuitry configured to use the laser junction itself as an effective resistive temperature device (RTD) device. Modern diode lasers, like most semiconductor structures change their properties with temperature. In particular, voltage drop across the laser diode at any given current level decreases (lowering effective junction resistance) as the temperature increases (e.g., at a rate around 2 millivolts or mV per degree Celsius or C). By monitoring the voltage drop as a function of the laser current, the systems and methods described herein can effectively measure the laser temperature exactly where it counts (e.g., at the junction itself), and can compensate for power losses caused by heating (e.g., self and/or non-self heating) of the laser in real time. This provides a number of advantages not found in alternative approaches such as using an RTD positioned near the laser diode, using a photodiode, or using a giant magneto-resistive (GMR) or touch down sensor.

In addition, the systems and methods described herein can be used to protect the laser diode from overheating and to measure ambient temperature. In several embodiments, the systems for measuring ambient and laser temperature in HAMR systems are disposed entirely in traditional preamplifier circuitry except for the laser/laser diode itself. In such case, no additional components for a hard disk drive configured for HAMR need to be added, which can result in low implementation costs. The systems and methods for measuring ambient and laser temperature described herein can provide a number of other advantages, including, for example, fast temperature measurements, real-time monitoring of laser temperature during a write event, real-time current adjustment to compensate for the laser diode self-heating, efficient laser diode operation, operation within safe temperature thresholds, and/or the elimination of a need for other components to monitor laser diode performance.

FIG. 1 is a top schematic view of a disk drive 100 including a heat assisted magnetic recording (HAMR) system including a preamplifier circuit 102 configured to measure temperature in a laser diode or ambient temperature in accordance with one embodiment of the invention. The laser diode (not visible in FIG. 1 but see 120 in FIG. 2) is physically coupled to a slider 104 including a head for magnetic writing and reading. Disk drive 100 may include one or more disks/media 106 to store data. Disk/media 106 resides on a spindle assembly 108 that is mounted to drive housing 110. Data may be stored along tracks in the magnetic recording layer of disk 106. The reading and writing of data is accomplished with the head 104 that has both read and write elements (not visible in FIG. 1 but see 104b and 104a, respectively, in FIG. 2). The write element 104a is used to alter the properties of the magnetic recording layer of disk 106 and thereby write information thereto. In one embodiment, head 104 may have magneto-resistive (MR), or giant magneto-resistive (GMR) elements. In an alternative embodiment, head 104 may be another type of head, for example, an inductive read/write head or a Hall effect head.

In operation, a spindle motor (not shown) rotates the spindle assembly 108, and thereby rotates disk 106 to position head 104 at a particular location along a desired disk track. The position of head 104 relative to disk 106 may be controlled by position control circuitry 112.

Selected components 114 of the HAMR system, including the slider 104, are positioned near an end of a suspension arm 116 that supports slider 104. Preamplifier circuit 102 is electrically coupled to slider 104 and laser diode (see 120 in FIG. 2) by signal lines 118 disposed along suspension 116. In operation, the preamplifier circuit 102 is configured to measure temperature in the laser diode 120 or ambient temperature in the disk drive 100. In the embodiment illustrated in FIG. 1, the preamplifier circuit 102 is depicted at a specific location along or near suspension arm 116. In other embodiments, the preamplifier circuit 102 can be positioned at other suitable locations. In one such embodiment, preamplifier circuit 102 can be implemented in control circuitry 112.

Figure 2:
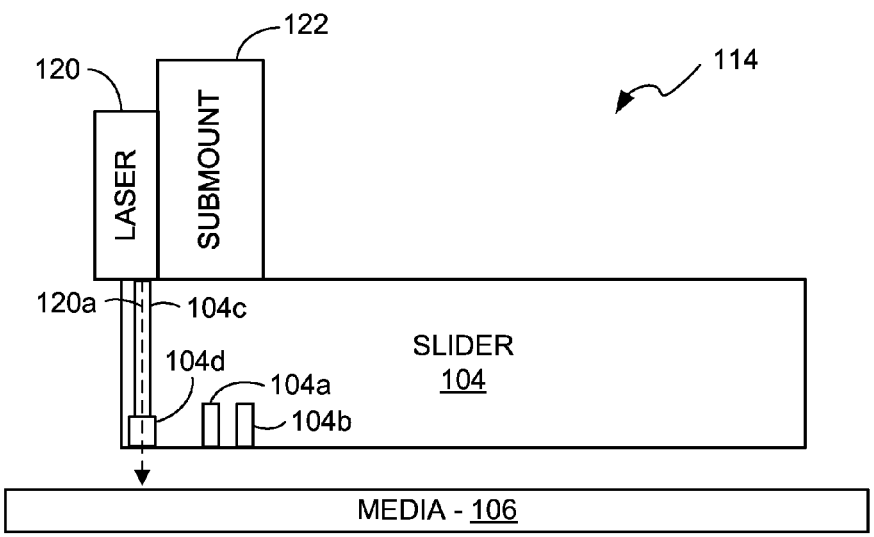
FIG. 2 is a side cross sectional schematic view of selected components of the HAMR system of FIG. 1 including the laser diode coupled to a slider and positioned over a magnetic medium in accordance with one embodiment of the invention.

FIG. 2 is a side cross sectional schematic view of the selected components 114 of the HAMR system of FIG. 1 including a laser diode 120 coupled to the slider 104 and positioned over the magnetic media 106 in accordance with one embodiment of the invention. The HAMR system components 114 also include a sub-mount 122 attached to a top surface of the slider 104. The laser diode 120 is attached to the sub-mount 122, and possibly to slider 104. The slider 104 includes the write element 104a and the read element 104b positioned along an air bearing surface (ABS) of the slider 104 for writing information to, and reading information from, respectively, the media 106. The slider also includes a waveguide 104c and a near field transducer (NFT) 104d positioned along the ABS.

In operation, the laser diode 120 is configured to direct light energy 120a to the waveguide 104c which directs the light to the NFT 104d. Upon receiving the light 120a from the laser diode via the waveguide 104c, the NFT 104d generates localized heat energy that heats a portion of the media 106 near the write element 104a and the read element 104b. The laser diode 120 is electrically coupled to the preamplifier circuit 102 via signal lines 118 (see FIG. 1), and the preamplifier circuit 102 is configured to measure temperature in the laser diode 120 or ambient temperature within the disk drive 100. More details on the operation of the preamplifier circuit 102 are described below. While a specific implementation of a HAMR system is illustrated in FIG. 1, other suitable HAMR implementations including a laser diode, which are well known in the art, may also be used.

Figure 3:
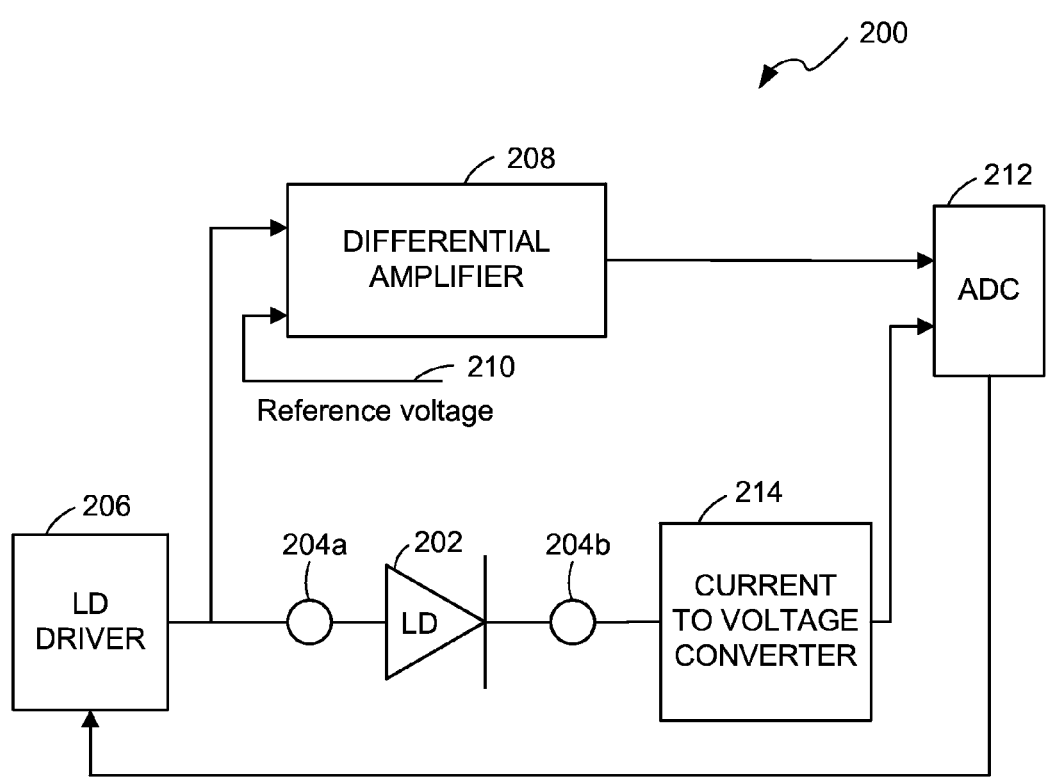
FIG. 3 is a schematic of a circuit configured to measure temperature in a laser diode or ambient temperature, where the circuit includes a preamplifier circuit coupled to the laser diode in accordance with one embodiment of the invention.

FIG. 3 is a schematic of a circuit 200 configured to measure temperature in a laser diode (LD) 202 or ambient temperature, where the circuit 200 includes a preamplifier circuit coupled to the laser diode 202 in accordance with one embodiment of the invention. In circuit 200, the preamplifier circuit consists of all components other than the laser diode (LD) 202. Preamplifier contact bumps 204a and 204b effectively mark a physical separation between the preamplifier circuit and the laser diode 202. As to the components, the preamplifier circuit includes a laser diode (LD) driver sub-circuit 206 coupled to an anode of the laser diode 202 and configured to provide driving current to the laser diode 202 at preselected levels. The LD driver 206 is also coupled to one input port of a differential amplifier 208. A second input port of the differential amplifier 208 is coupled to a reference voltage source 210. The output of the differential amplifier 208 is coupled to an analog to digital converter (ADC) 212 configured to convert the analog voltage output of the differential amplifier 208 into a digital value and provide it to the LD driver 206.

The cathode of the laser diode 202 is coupled to a current to voltage converter (e.g., IV converter) 214. The ADC 212 is coupled to an output port of the current to voltage converter 214 and configured to convert an analog output of the current to voltage converter 214 into a digital value and provide it to the LD driver 206. In operation, differential amplifier 208 is configured to measure a voltage provided to the laser diode 202 (e.g., voltage drop across the laser diode 202). The analog measured voltage is converted to a digital value at the ADC 212 and then provided to the LD driver 206. In operation, the current to voltage converter 214 is configured to measure an analog current flowing through the laser diode 202. The analog measured current is converted to a digital value at the ADC 212 and then provided to the LD driver 206.

In several embodiments, the LD driver sub-circuit 206 is configured to receive, store, and update calibration information including a set of temperatures corresponding with measurements of the voltage drop across the laser diode and measurements of the current through the laser diode. More details regarding the calibration of the laser diode 202 and preamplifier circuit will be described below. The LD driver sub-circuit 206 is also configured to calculate a temperature (e.g., real-time temperature) based on the voltage drop across the laser diode 202, the current through the laser diode, and the calibration information.

As to the operation of the differential amplifier 208, the voltage change with temperature is often small compared to the typical operation voltage of the diode. For instance, a sample laser diode can have an operation voltage, at say 40 mA of laser diode current (e.g., laser current), that is about 2.3 V at 25 C and about 2.15 V at 80 C. The typical voltage drop rate can be about 2 mV per degree C. The differential amplifier 208 can measure and amplify this small voltage change. To that end, the reference voltage 210 is subtracted from the voltage drop across the laser diode 202 and the amplifier output should be close to zero (though it may not be exactly equal to zero and can vary device to device) at predicted operation current. Analog amplification of this small difference should provide sufficient accuracy of the temperature measurement using even a low-resolution ADC 212 (e.g., 6 bit or greater). The current to voltage converter 214 monitors the laser current simultaneously with voltage drop measurement.

In several embodiments, the LD driver 206 provides driving current to the laser diode 202 in conjunction with a write signal to write information to the media via write element 104a. More specifically, in some embodiments, when the write signal is applied to the write head 104a of the slider 104, the LD driver 206 is configured to determine/calculate a temperature of the laser diode 202 and then calculate a current to be supplied to the laser diode based on the calculated temperature. The LD driver 206 can then provide the calculated driving current to the laser diode.

The LD driver 206 can be implemented with various components such as a processor and memory to store information including real-time temperature information and calibration information. In this context, the processor refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, etc., refer to any type of logic or circuitry capable of executing logic, commands, instructions, software, firmware, functionality, etc.

FIG. 3 represents one possible implementation of a circuit for measuring temperature in a laser diode or ambient temperature. In other embodiments, other suitable circuits can be used.

Figure 4:
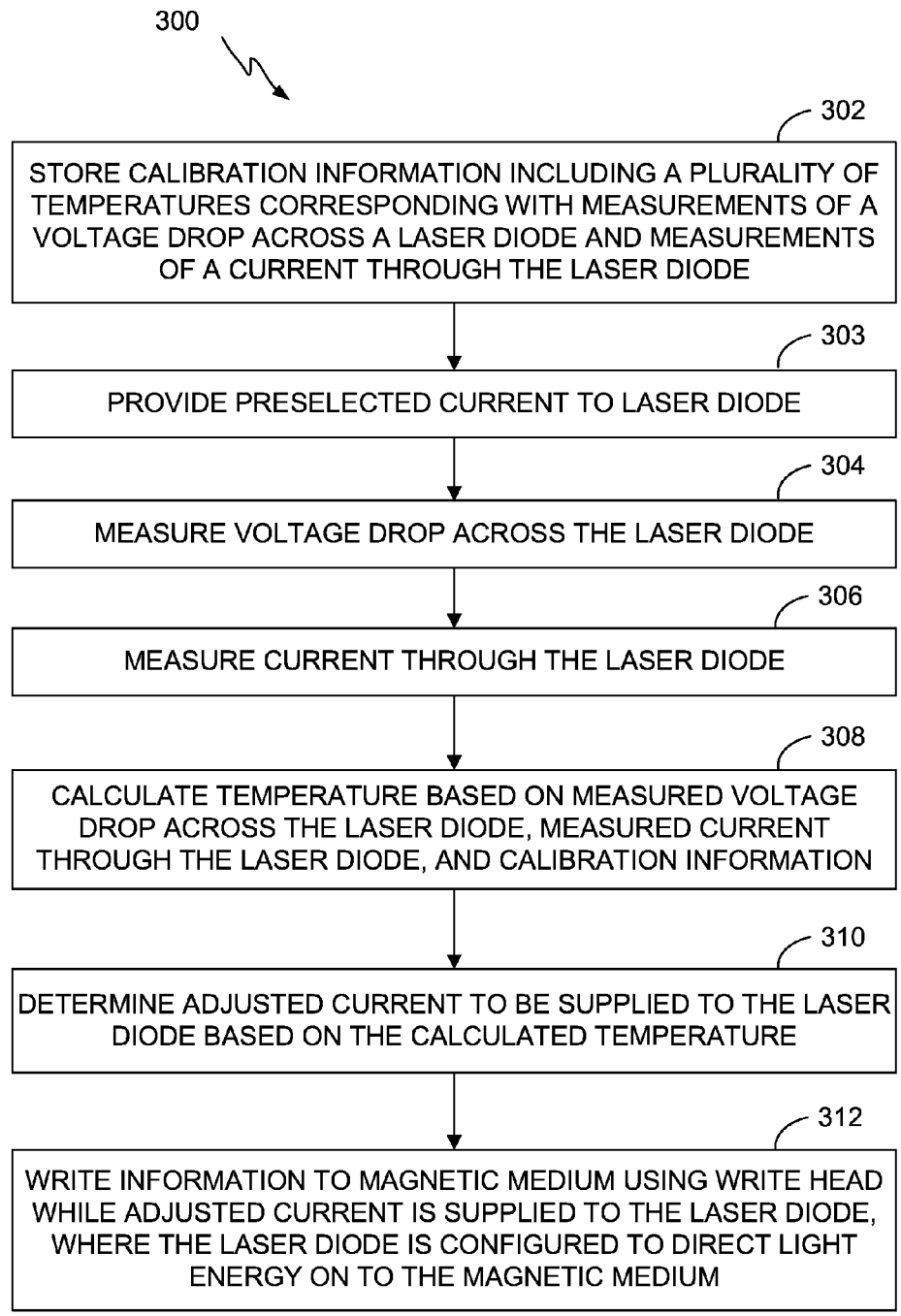
FIG. 4 is a flowchart of a process for measuring temperature in a laser diode or ambient temperature in accordance with one embodiment of the invention.

FIG. 4 is a flowchart of a process 300 for measuring temperature in a laser diode or ambient temperature in accordance with one embodiment of the invention. In particular embodiments, the process 300 can be executed by the LD driver circuit or other preamplifier circuitry of FIG. 3 or the preamplifier circuitry of FIG. 1. The process first stores (302) calibration information including a number of temperatures corresponding with measurements of a voltage drop across a laser diode and measurements of a current through the laser diode. In several embodiments, the process receives and then stores the calibration information. In one embodiment, the calibration information is obtained by measuring the plurality of temperatures using a temperature sensor to characterize the laser diode. In some embodiments, the calibration information is obtained, and calibration testing performed, by manufacturers of the laser diodes. In other embodiments, the calibration information is obtained, and calibration testing performed, by manufacturers of disk drives including the laser diodes. In some embodiments, the process updates the calibration information periodically based on updated characterization data, possibly performed using the circuitry of FIG. 3 and FIG. 7 described below.

The process then provides (303) a preselected current (e.g., test current associated with a particular write signal) to the laser diode. The process then measures (304) a voltage drop across the laser diode. The process measures (306) a current through the laser diode. In several embodiments, the measurement of the voltage drop and the measurement of the current occur about simultaneously. The process then calculates (308) a temperature based on the voltage drop across the laser diode, the current through the laser diode, and the calibration information. The process then determines (310) an adjusted current to be supplied to the laser diode based on the calculated temperature. The process then writes (312) information to a magnetic medium or media using a write head while the adjusted current is supplied to the laser diode, where the laser diode is configured to direct light energy on to the magnetic medium.

In several embodiments, the calculated temperature is either a temperature of the laser diode or an ambient temperature within an enclosure (e.g., disk drive housing) containing the write head, the laser diode, and the magnetic medium. In one embodiment, the process further includes comparing the calculated temperature with a threshold temperature (e.g., a safe threshold temperature above which damage to the laser diode may occur), and preventing, if the calculated temperature is greater than the threshold temperature, a flow of current to the laser diode.

In some embodiments, the process further includes calculating, when a write signal is applied to the write head (e.g., write element) of the slider, a current to be supplied to the laser diode based on the calculated temperature when the write signal is applied to the write head, and then providing, when the write signal is applied to the write head of the slider, the calculated current to the laser diode.

In one embodiment, the process can perform the sequence of actions in a different order. In another embodiment, the process can skip one or more of the actions. In other embodiments, one or more of the actions are performed simultaneously. In some embodiments, additional actions can be performed.

Figures 5A, 5B, 5C, 5D:
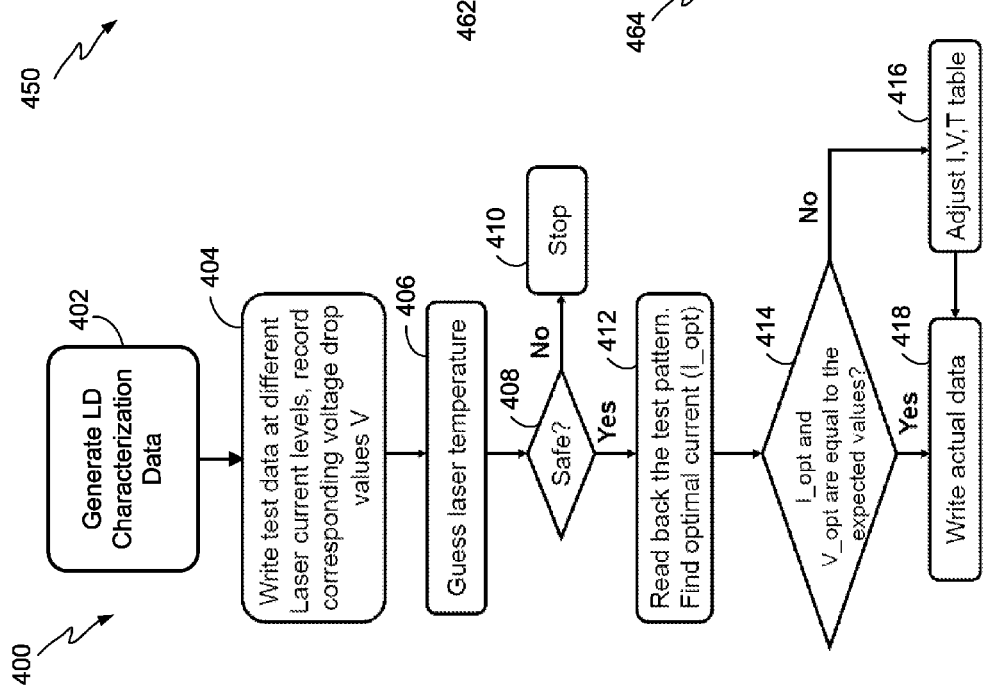
FIG. 5a is a flowchart of a process for generating calibration information for a system configured to measure temperature in a laser diode or ambient temperature in accordance with one embodiment of the invention.
FIG. 5b is a table illustrating characterization data/measurements of a laser diode at a preselected temperature of 24 degrees Celsius and associated with the process of FIG. 5a in accordance with one embodiment of the invention.
FIG. 5c is an equation for calculating a temperature of a laser diode based on a voltage drop across, and a current through, the laser diode and associated with the process of FIG. 5a in accordance with one embodiment of the invention.
FIG. 5d is a table illustrating calculated temperatures of a laser diode and associated measurements of voltage drop and current at a preselected calibration temperature of 24 degrees Celsius and associated with the process of FIG. 5a in accordance with one embodiment of the invention.

FIG. 5*a* is a flowchart of a process 400 for generating calibration information for a system configured to measure temperature in a laser diode or ambient temperature in accordance with one embodiment of the invention. In particular embodiments, process 400 can be used as a sub-process of process 300 of FIG. 4, and/or is performed by an individual or automated test equipment (e.g., manufacturer of laser diodes or disk drives including the laser diodes) to characterize a laser diode. The process first generates (402) laser diode (LD) characterization data. In some embodiments, this may involve a number of measurements of temperature (e.g., specific to laser diode or ambient using a temperature sensor for example), voltage drop across the laser diode, and corresponding current through the laser diode. An example of such LD characterization data is shown in FIG. 5*b*.

FIG. 5*b* is a table 450 illustrating characterization data/measurements of a laser diode at a preselected temperature of 24 degrees Celsius and associated with the process of FIG. 5*a* in accordance with one embodiment of the invention. The table 450 illustrates columns for a reading number 452, a current applied to the laser diode 454, a voltage drop 456 measured across the laser diode, and a measured optical power of the laser diode 458 for the preselected temperature of 24 C. In other embodiments, the process can perform similar measurements for other preselected temperatures.

Returning now to FIG. 5*a*, the process then writes (404) test data at different laser diode current levels and records the corresponding voltage drop values. The process then guesses (406) the laser diode temperature by correlating the particular measured voltage drop and laser diode current level to a temperature in the laser diode characterization/calibration information (such as the information illustrated in FIG. 5*b*). In one embodiment, the process guesses the laser temperature by employing an equation derived from the calibration information.

FIG. 5*c* is such an equation 462 for calculating/guessing a temperature of a laser diode based on a voltage drop across, and a current through, the laser diode and associated with the process of FIG. 5*a* in accordance with one embodiment of the invention. In equation 462, "mA" is the laser diode current in milliamps, and "V" is the measured voltage drop in volts.

FIG. 5*d* is a table 464 illustrating calculated temperatures 466 of a laser diode and associated measurements of voltage drop 468 and current 470 at a preselected calibration temperature of 24 degrees Celsius 472 and associated with the process of FIG. 5*a* in accordance with one embodiment of the invention. In several embodiments, table 464 represents measurements of voltage drop and current from block 404 of process 400 and calculated temperatures using equation 462 in block 406.

The process then determines (408) whether the guessed/calculated temperature is safe (e.g., by comparing the guessed temperature to a temperature threshold). If it is not safe, the process stops 410. If the guessed temperature is safe, then the process reads back (412) the test pattern and determines an optimal current value (I_opt) that correlates to an optimal write performance confirmed, for example, with a maximized signal to noise (SNR) measurement for the write performance. In several embodiments, the process determines the optimal current based at least in part on a known Curie temperature for the media near the laser diode. In several embodiments, the process determines the optimal current to further enhance the accuracy of the temperature measurement of the laser diode or the ambient temperature. In one embodiment, the process determines the optimal current to effectively recalibrate periodically for diode sample and contact resistance variations and laser diode aging, among other diode characteristics that may change over time.

The process then determines whether the optimal current (I_opt) and corresponding voltage drop measurement (V_opt) are about equal to the expected values (e.g., current and voltage values of the calibration information table(s)). If the values are not about equal, then the process adjusts 416 the current, voltage, temperature table (e.g., IVT table), which is effectively a table like that of FIG. 5d where adjustments for calculations of temperature based in part on optimal write values are recorded. If in block 414, the values are about equal, then the process writes (418) actual data, such as in the process of FIG. 6a described in further detail below.

In the embodiments illustrated in FIGS. 5b, 5c, and 5d, certain exemplary values are illustrated. In other embodiments, other suitable exemplary values can be used and/or additional exemplary values included. In other embodiments, for example, equation 462 can be refined and improved over time as additional measurements are made.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6B:
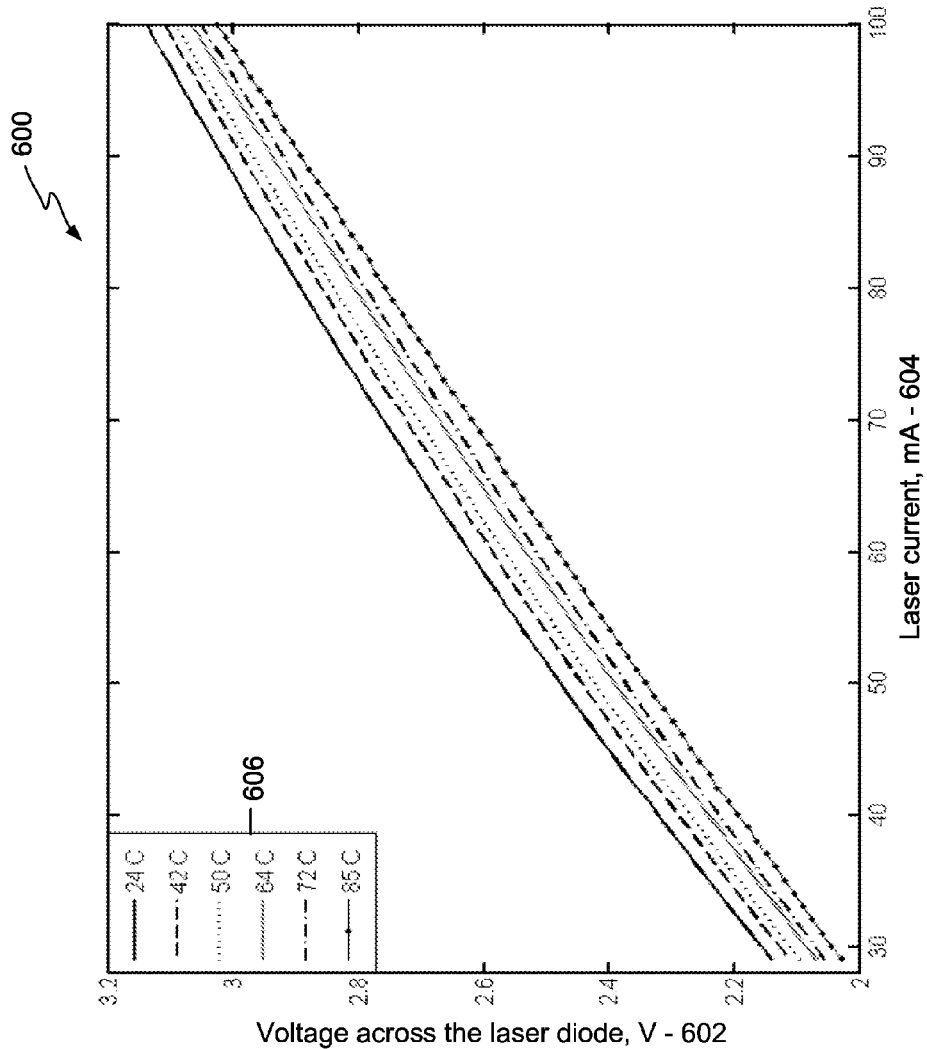
FIG. 6b is a graph illustrating measured voltage drop across a laser diode versus measured current through the laser diode for select temperatures that can be an output of the calibration process of FIG. 5a and used in the operation process of FIG. 6a in accordance with one embodiment of the invention.
Figure 6A:
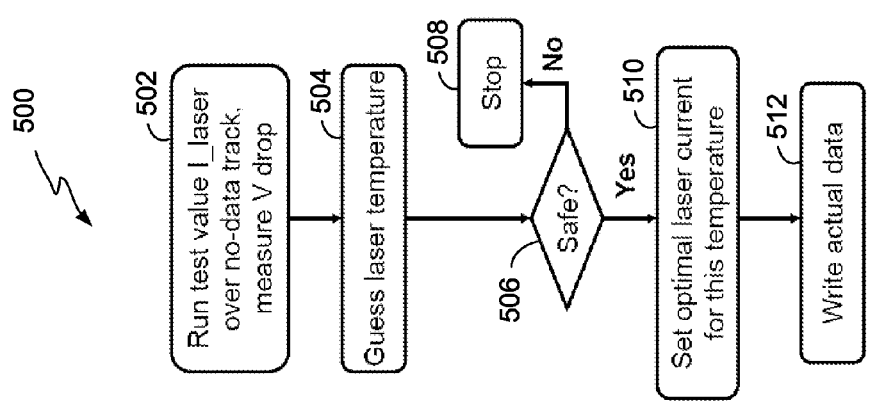
FIG. 6a is a flowchart of a process for operating a system configured to measure temperature in a laser diode or ambient temperature in accordance with one embodiment of the invention.

FIG. 6a is a flowchart of a process 500 for operating a system configured to measure temperature in a laser diode or ambient temperature in accordance with one embodiment of the invention. In particular embodiments, process 500 can be used as a sub-process of process 300 of FIG. 4 and/or can be executed by the LD driver circuit or other preamplifier circuitry of FIG. 3 or FIG. 1. The process first writes (502) a test value laser diode current over a no-data track on the media and measures the voltage drop across the laser diode. The process then guesses (504) a laser diode temperature using an IVT table, such as the one generated in process 400 of FIG. 5a and the exemplary one shown in FIG. 5d. In several embodiments, the process guesses the laser diode temperature by looking up the appropriate temperature in the IVT table corresponding to the applied current and measured voltage drop across the laser diode.

If the guessed temperature is not safe (e.g., above a safe threshold temperate), then the process stops (508). If the guessed temperature is safe, then the process sets (510) an optimal laser current based on the guessed temperature, and then writes (512) actual data to the media using the optimal laser current.

In one embodiment, the process can perform the sequence of actions in a different order. In another embodiment, the process can skip one or more of the actions. In other embodiments, one or more of the actions are performed simultaneously. In some embodiments, additional actions can be performed.

FIG. 6b is a graph 600 illustrating measured voltage drop 602 across a laser diode versus measured current 604 through the laser diode for select temperatures 606 that can be an output of the calibration process of FIG. 5a and used in the operation process of FIG. 6a in accordance with one embodiment of the invention. In several embodiments, the data of FIG. 6b is an output of the calibration process of FIG. 5a and/or another process involving direct measurement of the voltage drop across the laser diode as a function of current at select temperatures.

Figure 6C:
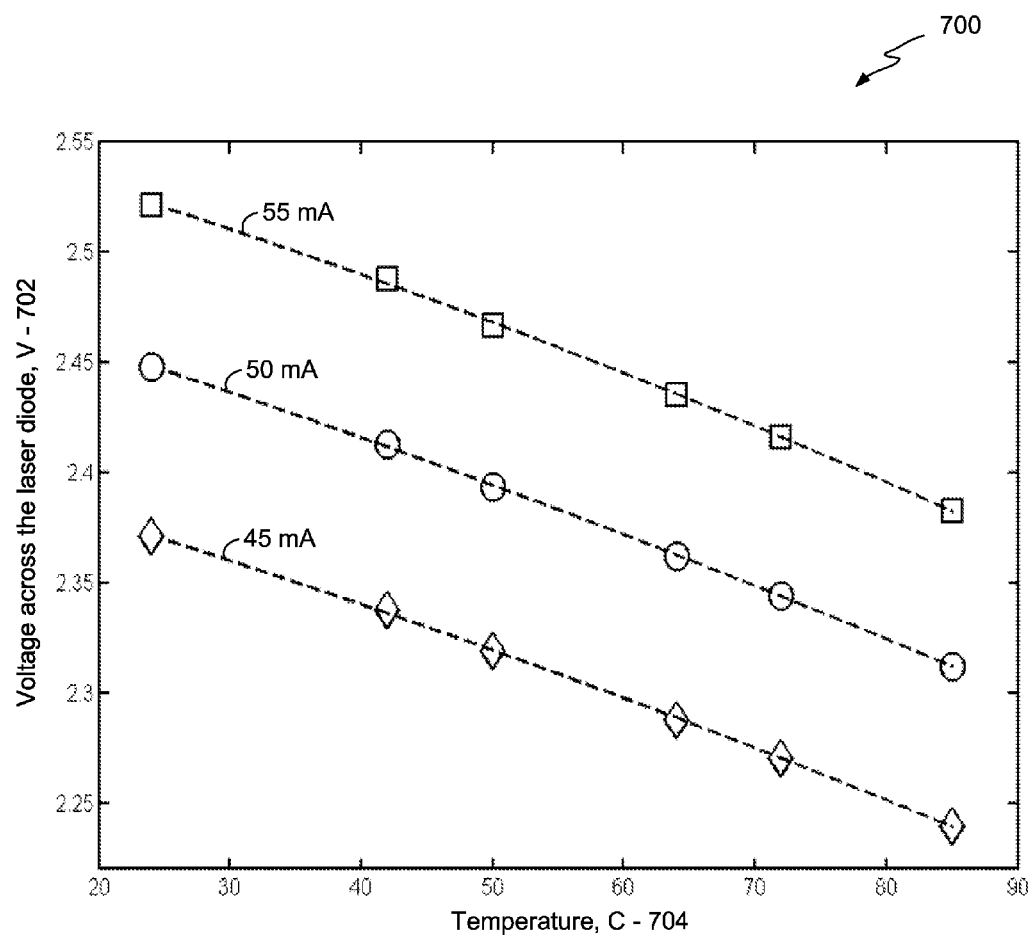
FIG. 6c is a graph illustrating measured voltage drop across a laser diode versus calculated temperature for three preselected measured currents through the laser diode that can be an output of the calibration process of FIG. 5a and used in the operation process of FIG. 6a in accordance with one embodiment of the invention.

FIG. 6c is a graph 700 illustrating measured voltage drop 702 across a laser diode versus calculated temperature 704 for three preselected measured currents (55 mA, 50 mA, 45 mA) through the laser diode that can be an output of the calibration process of FIG. 5a and used in the operation process of FIG. 6a in accordance with one embodiment of the invention. In FIG. 6c, the temperature dependence of the voltage drop across the laser diode (e.g., extracted from the data shown in FIG. 6b) at the preselected laser current levels is shown. A quadratic fit to the data was applied, but the second-order term is close to zero so a linear fit would also suffice even in this relatively wide temperature range. As can be seen in FIG. 6c, the measured temperature sensitivity is about 1.7 mV per degree C.

Figure 7:
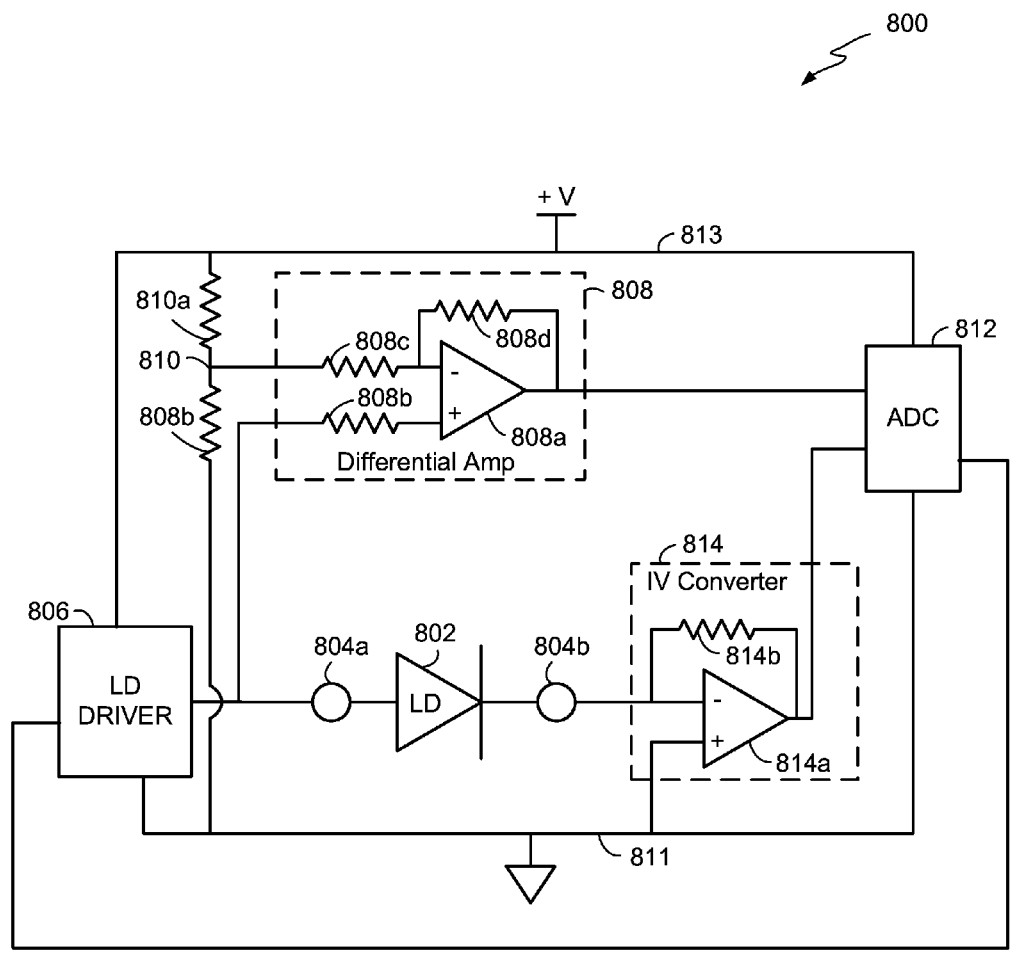
FIG. 7 is a schematic of a second circuit configured to measure temperature in a laser diode or ambient temperature, where the circuit includes a preamplifier circuit coupled to a laser diode in accordance with one embodiment of the invention.

FIG. 7 is a schematic of a second circuit 800 configured to measure temperature in a laser diode 802 or ambient temperature, where the second circuit 800 includes a preamplifier circuit coupled to a laser diode 802 in accordance with one embodiment of the invention. In circuit 800, the preamplifier circuit consists of all components other than the laser diode 802. Preamplifier contact bumps 804a and 804b effectively mark a separation between the preamplifier circuit and the laser diode 802. More specifically, the preamplifier circuit includes a laser diode (LD) driver sub-circuit 806 coupled to an anode of the laser diode 802 and configured to provide current to the laser diode 802 at preselected levels. The LD driver 806 is also coupled to one input port of a differential amplifier 808. A first input port of the differential amplifier 808 is coupled to a reference voltage 810. The reference voltage 810 is provided at a middle node of a voltage divider circuit consisting of a first resistor 810a coupled to a supply voltage source 813, and a second resistor 810b coupled to a ground 811. A number of components are also coupled to the ground 811 and the supply voltage source 813. The output of the differential amplifier 808 is coupled to an analog to digital converter (ADC) 812 configured to convert the analog voltage output of the differential amplifier 808 into a digital value and provide it to the LD driver 806.

The cathode of the laser diode 802 is coupled to a current to voltage converter (IV converter) 814. The ADC 812 is configured to convert an analog output of the current to voltage converter 814 into a digital value and provide it to the LD driver 806. In operation, differential amplifier 808 is configured to measure a voltage provided to the laser diode 802 (e.g., voltage drop across the laser diode 802). The analog measured voltage is converted to a digital value at the ADC 812 and then provided to the LD driver 806. In operation, the current to voltage converter 814 is configured to measure an analog current flowing through the laser diode 802. The analog measured current is converted to a digital value at the ADC 812 and then provided to the LD driver 806.

The differential amplifier 808 includes an operational amplifier 808a where a non-inverting input port (+) is coupled by resistor 808b to the anode of the laser diode 802. An inverting input port (−) of the operational amplifier 808a is coupled by a resistor 808c to the reference voltage 810, and by a resistor 808d to the output port of the operational amplifier 808a. Effectively, the differential amplifier 808 is in a non-inverting amplifier configuration.

The current to voltage converter (IV converter) 814 includes an operational amplifier 814a having the non-inverting input port coupled to ground 811, and the inverting input port coupled by a resistor 814b to an output of the operational amplifier 814a. Effectively, the current to voltage converter (IV converter) 814 is in an inverting amplifier configuration.

In one embodiment, the second circuit 800 can be operated in substantially the same manner as is described above for the circuit 200 of FIG. 3 and substituted for circuit 200 of FIG. 3 for executing any of the processes described above. In addition, the LD driver 806 can be implemented using the components described above for the circuit 200 of FIG. 3.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A system for measuring temperature in a heat assisted magnetic recording, the system comprising:
   a slider comprising a write head;
   a laser diode coupled to the slider and configured to direct energy to a magnetic medium; and
   a preamplifier circuit comprising:
      a voltage measurement circuit configured to measure a voltage drop across the laser diode; and
      a current measurement circuit configured to measure a current through the laser diode;
   wherein the preamplifier circuit is configured to:
      store calibration information comprising a plurality of temperatures corresponding with measurements of the voltage drop across the laser diode and measurements of the current through the laser diode; and
      calculate a temperature based on the measured voltage drop across the laser diode, the measured current through the laser diode, and the calibration information.

2. The system of claim 1, wherein the calculated temperature is selected from the group consisting of a temperature of the laser diode and an ambient temperature within an enclosure containing the slider, the laser diode, and the magnetic medium.

3. The system of claim 1, wherein the preamplifier circuit is further configured to determine an adjusted current to be supplied to the laser diode based on the calculated temperature.

4. The system of claim 3, wherein the preamplifier circuit is further configured to write information to the magnetic medium while the adjusted current is supplied to the laser diode.

5. The system of claim 1, wherein the preamplifier circuit is further configured to:
   compare the calculated temperature with a threshold temperature; and
   prevent, if the calculated temperature is greater than the threshold temperature, a flow of current to the laser diode.

6. The system of claim 1:
   wherein the voltage measurement circuit comprises a differential amplifier coupled to an anode of the laser diode and a reference voltage;
   wherein the current measurement circuit comprises a current to voltage converter coupled to a cathode of the laser diode; and
   wherein the preamplifier circuit comprises an analog to digital converter configured to convert analog measurements from the voltage measurement circuit and the current measurement circuit into digital measurements.

7. The system of claim 6:
   wherein the differential amplifier of the voltage measurement circuit comprises a non-inverting amplifier configuration;
   wherein the current to voltage converter comprises an operational amplifier in an inverting amplifier configuration; and
   wherein the analog to digital converter has a resolution of at least 6 bits.

8. The system of claim 1, wherein the plurality of temperatures of the calibration information are measured using a temperature sensor for a calibration to characterize the laser diode.

9. The system of claim 1:
   wherein, when a write signal is applied to the write head of the slider, the preamplifier circuit is configured to:
      calculate a current to be supplied to the laser diode based on the calculated temperature; and
      provide the calculated current to the laser diode.

10. The system of claim 1, wherein the laser diode is configured to direct light energy to a near field transducer configured to cause heating of a portion of the magnetic medium.

11. A method for measuring temperature in a heat assisted magnetic recording, the method comprising:
   storing calibration information comprising a plurality of temperatures corresponding with measurements of a voltage drop across a laser diode and measurements of a current through the laser diode;
   providing a preselected current to the laser diode;
   measuring a voltage drop across the laser diode;
   measuring a current through the laser diode;
   calculating a temperature based on the measured voltage drop across the laser diode, the measured current through the laser diode, and the calibration information;
   determining an adjusted current to be supplied to the laser diode based on the calculated temperature; and writing information to a magnetic medium using a write head while the adjusted current is supplied to the laser diode, wherein the laser diode is configured to direct light energy on to the magnetic medium.

12. The method of claim 11, wherein the calculated temperature is selected from the group consisting of a temperature of the laser diode and an ambient temperature within an enclosure containing the write head, the laser diode, and the magnetic medium.

13. The method of claim 11, further comprising:
comparing the calculated temperature with a threshold temperature; and
preventing, if the calculated temperature is greater than the threshold temperature, a flow of current to the laser diode.

14. The method of claim 11:
wherein the measuring the voltage drop across the laser diode comprises using a voltage measurement circuit comprising a differential amplifier coupled to an anode of the laser diode and a reference voltage;
wherein the measuring the current through the laser diode comprises using a current measurement circuit comprising a current to voltage converter coupled to a cathode of the laser diode; and
wherein the calculating the temperature based on the voltage drop across the laser diode, the current through the laser diode, and the calibration information comprises using an analog to digital converter configured to convert analog measurements from the voltage measurement circuit and the current measurement circuit into digital measurements.

15. The method of claim 14:
wherein the differential amplifier of the voltage measurement circuit comprises a non-inverting amplifier configuration;
wherein the current to voltage converter comprises an operational amplifier in an inverting amplifier configuration; and
wherein the analog to digital converter has a resolution of at least 6 bits.

16. The method of claim 11, wherein the storing calibration information comprising the plurality of temperatures corresponding with measurements of the voltage drop across the laser diode and measurements of the current through the laser diode comprises measuring the plurality of temperatures of the calibration information using a temperature sensor to characterize the laser diode.

17. The method of claim 11, further comprising:
calculating, when a write signal is applied to the write head of a slider, a current to be supplied to the laser diode based on the calculated temperature when the write signal is applied to the write head; and
providing, when the write signal is applied to the write head of the slider, the calculated current to the laser diode.

18. The method of claim 11, wherein the laser diode is configured to direct light energy to a near field transducer configured to cause heating of a portion of the magnetic medium.

* * * * *